US011228947B2

United States Patent
Tang et al.

(10) Patent No.: US 11,228,947 B2
(45) Date of Patent: Jan. 18, 2022

(54) NETWORK SLICE DEPLOYMENT METHOD AND RELATED DEVICE

(71) Applicant: HUAWEI TECHNOLOGIES CO., LTD., Shenzhen (CN)

(72) Inventors: Delong Tang, Shenzhen (CN); Ruiyue Xu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/828,964

(22) Filed: Mar. 25, 2020

(65) Prior Publication Data

US 2020/0236594 A1 Jul. 23, 2020

Related U.S. Application Data

(63) Continuation of application No. PCT/CN2018/099867, filed on Aug. 10, 2018.

(30) Foreign Application Priority Data

Sep. 25, 2017 (CN) .......................... 201710879836.7

(51) Int. Cl.
*H04W 28/24* (2009.01)
*H04L 12/24* (2006.01)

(52) U.S. Cl.
CPC ......... *H04W 28/24* (2013.01); *H04L 41/5045* (2013.01); *H04L 41/5051* (2013.01)

(58) Field of Classification Search
CPC ...... H04W 28/24; H04W 76/11; H04W 76/12; H04W 48/18; H04L 41/5045; H04L 41/5051; H04L 41/5048; H04L 41/0893; H04L 41/5019
See application file for complete search history.

(56) References Cited

U.S. PATENT DOCUMENTS

| | | | |
|---|---|---|---|
| 2016/0352924 | A1 | 12/2016 | Senarath et al. |
| 2016/0353367 | A1 | 12/2016 | Vrzic et al. |
| 2017/0070892 | A1 | 3/2017 | Song et al. |
| 2017/0141973 | A1 | 5/2017 | Vrzic |

(Continued)

FOREIGN PATENT DOCUMENTS

| | | |
|---|---|---|
| CN | 105813195 A | 7/2016 |
| CN | 106550410 A | 3/2017 |

(Continued)

OTHER PUBLICATIONS

Huawei, Key principles for Support of Network Slicing in RAN . RAN WG3 Meeting #92, Nanjing, China, May 23-27, 2016, R3-161133, 6 pages.

(Continued)

*Primary Examiner* — Joe Chacko
(74) *Attorney, Agent, or Firm* — Rimon PC

(57) ABSTRACT

A network slice deployment method is provided. Under the method, a network device receives a first request message instructing to deploy a target network slice for providing a target service to the terminal device, from a terminal device. The network device sends a second request message to the management function entity for indicating the target network slice information. The network device receives a second response message indicating that the target network slice has been completely deployed.

12 Claims, 10 Drawing Sheets

(56) References Cited

U.S. PATENT DOCUMENTS

2018/0249530 A1* 8/2018 Salkintzis ............. H04W 48/18
2019/0037409 A1* 1/2019 Wang ................... H04W 16/04

FOREIGN PATENT DOCUMENTS

| CN | 106657194 A | 5/2017 |
| --- | --- | --- |
| WO | 2017063708 A1 | 4/2017 |
| WO | 2017113109 A1 | 7/2017 |

OTHER PUBLICATIONS

ZTE, Network Slice Selection Procedure. 3GPP TSG RAN WG3 Meeting #92, Nanjing, China, 23th May 27, 2016, R3-161107, 4 pages.

3GPP TR 28.801 V0.4.0:"3rd Generation Partnership Project;Technical Specification Group Services and System Aspects;Telecommunication management;Study on management and orchestration of network slicing for next generation network (Release 14)",Jan. 2017,total 38 pages.

3GPP TSG RAN WG2 Meeting Ad Hoc ,R2-1700225: Consideration on RAN slicing support CATT Spokane, USA, Jan. 17-19, 2017, total 5 pages.

3GPP TSG-RAN WG3 Meeting #92,R3-161356:"Solutions for for Network Slice Selection",Nokia, Alcatel-Lucent Shanghai Bell ,Nanjing, China, May 23-27, 2016,total 6 pages.

3GPP TSG-SA WG1 Meeting #74,S1-161110:"Consolidation of recommended requirement for NEO",Huawei Technologies, China Mobile,Venice, Italy, May 9-13, 2016,total 21 pages.

* cited by examiner

NETWORK SLICE DEPLOYMENT METHOD AND RELATED DEVICE

CROSS-REFERENCE TO RELATED APPLICATIONS

This application is a continuation of International Application No. PCT/CN2018/099867, filed on Aug. 10, 2018, which claims priority to Chinese Patent Application No. 201710879836.7, filed on Sep. 25, 2017, The disclosures of the aforementioned applications are hereby incorporated by reference in their entireties.

TECHNICAL FIELD

This application relates to the communications field, and in particular, to a network slice deployment method and a related device.

BACKGROUND

In fifth-generation mobile communication technology (5th Generation, 5G), one typical business mode is that an operator splits a physical wireless network into a plurality of logical networks by using slicing technology and leases them to vertical industries and enterprises, where each logical network may have different functional characteristics and service resources, to meet different service needs. A concept diagram of slices in a next-generation mobile communications network (next generation mobile networks, NGMN) is shown in FIG. 1.

In an existing solution, in service logic of a current slice, a tenant needs to specify a service level agreement (service level agreement, SLA) index and a related service scenario in advance, and rents a network from an operator. The operator designs and deploys the slice based on requirements of the tenant, and a terminal to which the tenant belongs cannot really use the slice until the slice is completely deployed in a wireless network. A specific process is shown in FIG. 2.

In the existing solution, the slice needs to be first deployed and then used. On the one hand, to carry a service of the tenant, the slice needs to enable some unique functional characteristics, and enabling of the functional characteristics consumes resources; on the other hand, to enable access of the service of the tenant at any time, the slice needs to reserve some resources. When there are a temporal gap and a geographic gap between deployment and use of a slice, where the temporal gap specifically means that the slice is deployed in advance, but used later, and the geographic gap specifically means that deployment is performed in a relatively large area, but the service actually occurs only in a relatively small area, network resources are wasted, and costs are increased.

SUMMARY

Embodiments provide a network slice deployment method and a related device, to reduce a gap between deployment and use of a network slice, thereby saving network resources and reducing costs.

A first aspect in accordance with the present disclosure provides a network slice deployment method, including: receiving, by a network device, a first request message sent by a terminal device, where the first request message is used to instruct to deploy a target network slice for providing a target service to the terminal device, the target service is a service that has subscribed to the network slice, and a corresponding management function entity has allocated target network slice information for the target network slice corresponding to the target service; sending, by the network device, a second request message to the management function entity based on the received first request message, where the second request message carries the corresponding target network slice information used to instruct the management function entity to deploy the target network slice; and after the management function entity deploys the target network slice on the network device, receiving, by the network device, a second response message sent by the management function entity, where the second response message is used to indicate that the target network slice has been completely deployed, and the target network slice is a network slice to which the target service subscribes. In this embodiment of this application, the network device deploys, based on a received service request, the network slice in real time in a service initiation phase, to reduce a gap between deployment and use of the network slice, thereby saving network resources and reducing costs.

In an example design, in a first implementation of the first aspect, before the receiving, by a network device, a first request message sent by a terminal device, the method further includes: receiving, by the network device, the target network slice information sent by the management function entity, where the target network slice information includes a target network slice identification, and the target network slice identification corresponds to the target network slice information. In the Embodiments, a process in which the network device receives the target network slice information is added, and the second request message needs to carry the target network slice identification when the network device sends the second request message, thereby making the Embodiments more complete in terms of steps.

In an example design, in a second implementation of the first aspect, after the receiving, by the network device, a second response message sent by the management function entity, the method further includes: sending, by the network device, a first response message to the terminal device, where the first response message is used to indicate that the terminal device can provide a service by using the deployed target network slice. In the Embodiments, a process in which the network device sends the first response message to the terminal device is added, thereby making the Embodiments more logical.

A second aspect in accordance with the present disclosure provides a network slice deployment method, including: receiving, by a management function entity, a second request message sent by a network device, where the second request message carries target network slice information, the target network slice information is used to identify a target network slice, the management function entity has recorded the target network slice to which a target service subscribes, and the target service is a service that is to be initiated by a terminal device; obtaining, by the management function entity, corresponding target network slice deployment information based on the target network slice information, and deploying the target network slice based on the target network slice deployment information, where the target network slice is a network slice to which the target service subscribes; and sending, by the management function entity, a second response message to the network device, where the second response message is used to indicate that the target network slice has been completely deployed. In this embodiment of this application, the management function entity deploys, based on the second request message sent by the network device, the network slice in real time in a service initiation phase, to reduce a gap between deployment and use of the network slice, thereby saving network resources and reducing costs.

In an example design, in a first implementation of the second aspect, the network slice information includes a target network slice identification, and the network slice identification is used to uniquely identify the target network slice. In the Embodiments, the network slice information is defined, thereby making this application more complete in terms of steps.

In an example design, in a second implementation of the second aspect, before the receiving, by a management function entity, a second request message sent by a network device, the method further includes: generating, by the management function entity, the target network slice information. In the Embodiments, a process in which the management function entity generates the target network slice information is added, thereby making the Embodiments more logical.

In an example design, in a third implementation of the second aspect, the generating, by the management function entity, the target network slice information includes: generating, by the management function entity, a target network slice identification and the corresponding target network slice deployment information by using a network management entity, where the target network slice deployment information is used to deploy the target network slice. In the Embodiments, a process in which the management function entity generates the target network slice information is refined, thereby increasing implementations of the Embodiments.

In an example design, in a fourth implementation of the second aspect, after the generating, by the management function entity, the target network slice information and a target network slice identification, the method further includes: sending, by the management function entity, the target network slice information to the network device; or sending, by the management function entity, the target network slice information to the terminal device. In the Embodiments, a process in which the management function entity sends the target network slice information to the network device or the terminal device is added, so that a network slice deployment request message may carry the target network slice information when the network device sends the network slice deployment request message, thereby making the Embodiments more logical.

In an example design, in a fifth implementation of the second aspect, after the receiving, by a management function entity, a second request message sent by a network device, and before the obtaining, by the management function entity, corresponding target network slice deployment information based on the target network slice information, and deploying a target network slice based on the target network slice deployment information, the method further includes: performing, by the management function entity, authentication on the received target network slice information. In the Embodiments, a process in which the management function entity performs authentication on the target network slice information carried by the terminal device when the terminal device initiates a service is added, thereby making the Embodiments more complete in terms of steps.

In an example design, in a sixth implementation of the second aspect, the target network slice is deployed in an area of a preset size in which the terminal device is located. The deployed location of the target network slice is described in the Embodiments, so that achievability and operability of the Embodiments are improved.

A third aspect in accordance with the present disclosure provides a network slice deployment method, including: sending, by a terminal device, a first request message to a network device, where the first request message is used to instruct to deploy a target network slice for providing a target service to the terminal device, and a corresponding management function entity has allocated target network slice information for the target network slice corresponding to the target service; and performing, by the terminal device, a service by using the deployed target network slice. In this embodiment of this application, the terminal device initiates a service to the network device, so that the network device deploys the network slice in real time in a service initiation phase, to reduce a gap between deployment and use of the network slice, thereby saving network resources and reducing costs.

In an example design, in a first implementation of the third aspect, before the sending, by a terminal device, a first request message to a network device, the method further includes: receiving, by the terminal device, the target network slice information sent by the management function entity. In the Embodiments, a process in which the terminal device receives the target network slice information is added, and a target network service request message needs to carry the target network slice identification when the terminal device initiates the target network service request message, thereby making the Embodiments more complete in terms of steps.

In an example design, in a second implementation of the third aspect of the Embodiments, the first request message includes the target network slice information. In the Embodiments, the network slice service request message is defined, thereby increasing implementations of the Embodiments.

In an example design, in a third implementation of the third aspect, after the sending, by a terminal device, a first request message to a network device, and before the performing, by the terminal device, a service by using the deployed target network slice, the method further includes: receiving, by the terminal device, a first response message sent by the network device, where the first response message is used to indicate that the terminal device can provide a service by using the deployed target network slice. In the Embodiments, a process in which the terminal device receives the first response message sent by the network device is added, and then, the terminal device initiates a target service, thereby making the Embodiments more complete in terms of steps.

A fourth aspect in accordance with the present disclosure provides a network device, including: a first receiving unit, configured to receive a first request message sent by a terminal device, where the first request message is used to instruct to deploy a target network slice for providing a target service to the terminal device, and a corresponding management function entity has allocated target network slice information for the target network slice corresponding to the target service; a first sending unit, configured to send a second request message to the management function entity, where the second request message carries the target network slice information, and the second request message is used to instruct the management function entity to deploy the target network slice corresponding to the target network slice information; and a second receiving unit, configured to receive a second response message sent by the management function entity, where the second response message is used to indicate that the target network slice has been completely deployed. In this embodiment of this application, the network device deploys, based on a received service request, the network slice in real time in a service initiation phase, to reduce a gap between deployment and use of the network slice, thereby saving network resources and reducing costs.

In an example design, in a first implementation of the fourth aspect, before the receiving, by a network device, a first request message sent by a terminal device, the network device further includes: a third receiving unit, configured to receive the target network slice information sent by the management function entity, where the target network slice information includes a target network slice identification. In the Embodiments, a process in which the network device receives the target network slice information is added, and the second request message needs to carry the target network slice identification when the network device sends the second request message, thereby making the Embodiments more complete in terms of steps.

In an example design, in a second implementation of the fourth aspect, after the receiving, by the network device, a second response message sent by the management function entity, the network device further includes: a second sending unit, configured to send a first response message to the terminal device, where the first response message is used to indicate that the terminal device can provide a service by using the deployed target network slice. In the Embodiments, a process in which the network device sends the first response message to the terminal device is added, thereby making the Embodiments more logical.

A fifth aspect in accordance with the present disclosure provides a management function entity, including: a receiving unit, configured to receive a second request message sent by a network device, where the second request message carries target network slice information; a deployment unit, configured to: obtain corresponding target network slice deployment information based on the target network slice information, and deploy a target network slice based on the target network slice deployment information; and a sending unit, configured to send a second response message to the network device, where the second response message is used to indicate that the target network slice has been completely deployed. In this embodiment of this application, the management function entity deploys, based on the second request message sent by the network device, the network slice in real time in a service initiation phase, to reduce a gap between deployment and use of the network slice, thereby saving network resources and reducing costs.

In an example design, in a first implementation of the fifth aspect, the network slice information includes a target network slice identification, and the network slice identification is used to uniquely identify the target network slice. In the Embodiments, the network slice information is defined, thereby making this application more complete in terms of steps.

In an example design, in a second implementation of the fifth aspect, before the management function entity receives a second request message sent by a network device, the management function entity further includes: a processing unit, configured to generate the target network slice information. In the Embodiments, a process in which the management function entity generates the target network slice information is added, thereby making the Embodiments more logical.

In an example design, in a third implementation of the fifth aspect, the processing unit includes a generation module, configured to generate a target network slice identification and the corresponding target network slice deployment information by using a network management entity, where the target network slice deployment information is used to deploy the target network slice. In the Embodiments, a process in which the management function entity generates the target network slice information is refined, thereby increasing implementations of the Embodiments.

In an example design, in a fourth implementation of the fifth aspect, after the management function entity generates the target network slice information and a target network slice identification, the processing unit further includes: a sending module, configured to send the target network slice information to the network device; or send the target network slice information to the terminal device. In the Embodiments, a process in which the management function entity sends the target network slice identification to the network device or the terminal device is added, so that the second request message may carry the target network slice information when the network device sends the second request message, thereby making the Embodiments more logical.

In an example design, in a fifth implementation of the fifth aspect, after the management function entity receives a second request message sent by a network device, and before the management function entity obtains corresponding target network slice deployment information based on the target network slice information, and deploys a target network slice based on the target network slice deployment information, the management function entity further includes: an authentication unit, configured to perform authentication on the received target network slice information. In the Embodiments, a process in which the management function entity performs authentication on the target network slice information added by the terminal device when the terminal device initiates a service is added, thereby making the Embodiments more complete in terms of steps.

In an example design, in a sixth implementation of the fifth aspect, the target network slice is deployed in an area of a preset size in which the terminal device is located. The deployed location of the target network slice is described in the Embodiments, so that achievability and operability of the Embodiments are improved.

A sixth aspect in accordance with the present disclosure provides a terminal device, including: a sending unit, configured to send a first request message to a network device, where the first request message is used to instruct to deploy a target network slice for providing a target service to the terminal device, and a corresponding management function entity has allocated target network slice information for the target network slice corresponding to the target service; and a processing unit, configured to use the deployed target network slice to perform a service. In this embodiment of this application, the terminal device initiates a service to the network device, so that the network device deploys the network slice in real time in a service initiation phase, to reduce a gap between deployment and use of the network slice, thereby saving network resources and reducing costs.

In an example design, in a first implementation of the sixth aspect, before the sending, by the terminal device, a first request message to a network device, the terminal device further includes: a first receiving unit, configured to receive the target network slice information sent by the management function entity. In the Embodiments, a process in which the terminal device receives the target network slice information is added, and a target network service request message needs to carry the target network slice identification when the terminal device initiates the target network service request message, thereby making the Embodiments more complete in terms of steps.

In an example design, in a second implementation of the sixth aspect of the Embodiments, the first request message includes the target network slice information. In the Embodiments, the network slice service request message is defined, thereby increasing implementations of the Embodiments.

In an example design, in a third implementation of the sixth aspect, after the terminal device sends the first request message to the network device, and before the terminal device performs a service by using the deployed target network slice, the terminal device further includes: a second receiving unit, configured to receive a first response message sent by the network device, where the first response message is used to indicate that the terminal device can provide a service by using the deployed target network slice. In this embodiment of this application, a process in which the terminal device receives the first response message sent by the network device is added, and then, the terminal device initiates a target service, thereby making the embodiments more complete in terms of steps.

A seventh aspect in accordance with the present disclosure provides a network device, including: a memory, a transceiver, and at least one processor, where the memory stores an instruction, the memory, the transceiver, and the at least one processor are interconnected through a line, and the transceiver is configured to perform information sending and receiving operations on the network device side in any one of the methods according to the first aspect; and the at least one processor invokes the instruction, to perform a message processing or control operation on the network device side in any one of the methods according to the first aspect.

An eighth aspect in accordance with the present disclosure provides a management function entity, including: a memory, a transceiver, and at least one processor, where the memory stores an instruction, the memory, the transceiver, and the at least one processor are interconnected through a line, and the transceiver is configured to perform information sending and receiving operations on the management function entity side in any one of the methods according to the second aspect; and the at least one processor invokes the instruction, to perform a message processing or control operation on the management function entity side in any one of the methods according to the second aspect.

A ninth aspect in accordance with the present disclosure provides a terminal device, including: a memory, a transceiver, and at least one processor, where the memory stores an instruction, the memory, the transceiver, and the at least one processor are interconnected through a line, and the transceiver is configured to perform information sending and receiving operations on the terminal device side in any one of the methods according to the third aspect; and the at least one processor invokes the instruction, to perform a message processing or control operation on the terminal device side in any one of the methods according to the third aspect.

A tenth aspect in accordance with the present disclosure provides a chip system. The chip system includes a processor, where the processor is configured to support a network device, a management function entity, and a terminal device in implementing a function included in the foregoing aspects, for example, sending or processing data and/or information included in the foregoing method. In an example design, the chip system further includes a memory. The memory is configured to store a program instruction and data that are necessary for the network device, the management function entity, and the terminal device. The chip system may be formed by a chip, or may include a chip and another discrete device.

An eleventh aspect in accordance with the present disclosure provides a computer-readable storage medium. The computer-readable storage medium stores an instruction, and when run on a computer, the computer-readable storage medium enables the computer to perform the method according to the foregoing aspects.

A twelfth aspect in accordance with the present disclosure provides a computer program product including an instruction, and when run on a computer, the computer program product enables the computer to perform the method according to the foregoing aspects.

A thirteenth aspect in accordance with the present disclosure provides a network slice deployment system, including: a network device and a management function entity, where the network device is the network device according to the seventh aspect, and the management function entity is the management function entity according to the eighth aspect. The network device and the management function entity in the network slice deployment system are configured to perform the method according to the aspects described above.

DESCRIPTION OF EMBODIMENTS

Embodiments provide a network slice deployment method, to reduce a gap between deployment and use of a slice, thereby saving network resources and reducing costs.

To make a person skilled in the art understand the technical solutions in this application better, the following describes the technical solutions in the Embodiments with reference to the accompanying drawings in the Embodiments.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. In addition, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

Figure 1:
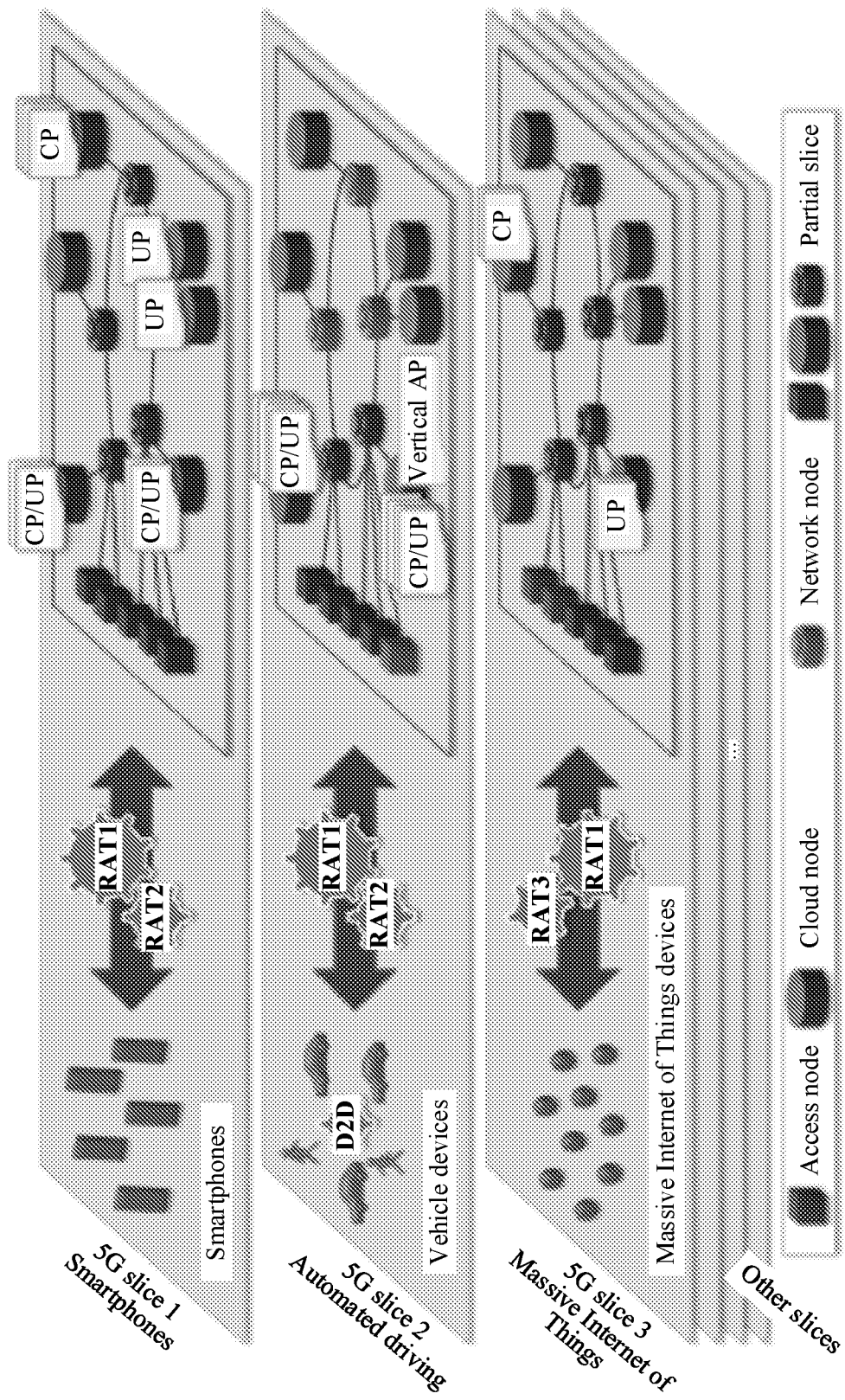
FIG. 1 is a concept diagram of slices in a next-generation mobile communications network.
Figure 2:
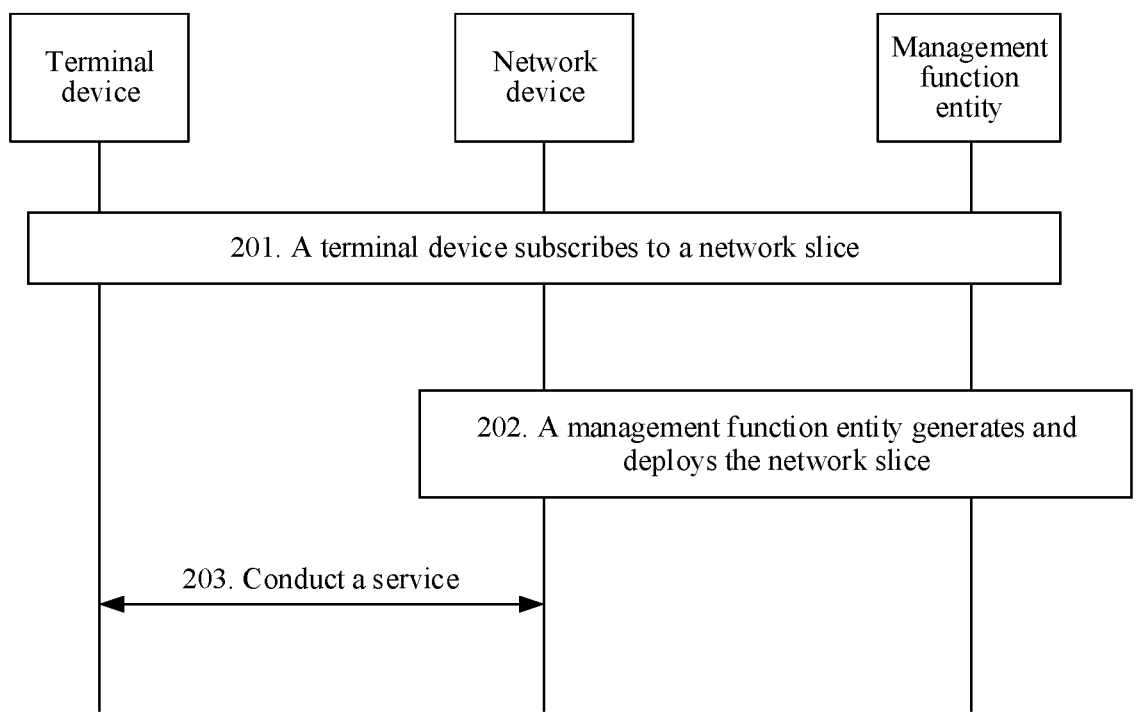
FIG. 2 is a schematic flowchart of slice deployment in the prior art.
Figure 3:
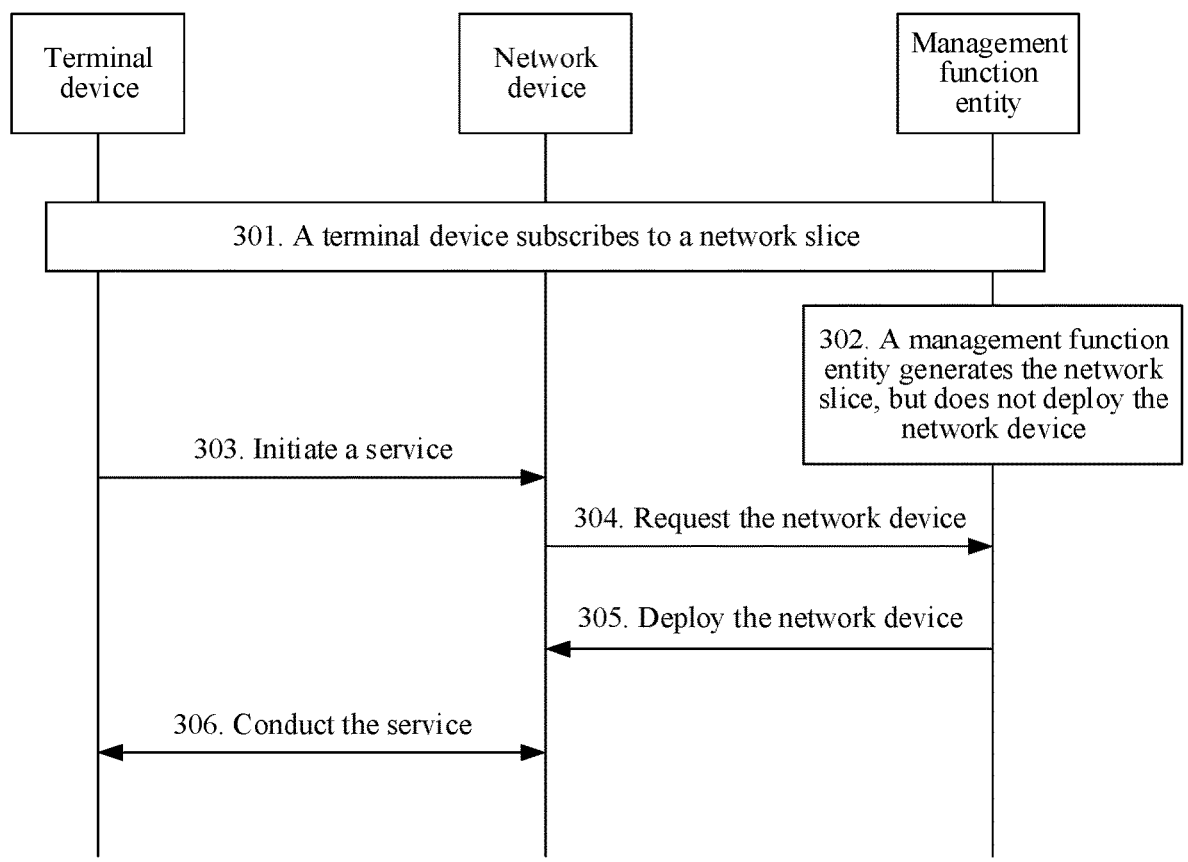
FIG. 3 is a schematic diagram of an applied network architecture according to an embodiment of this application.

This embodiment may be applied to a network architecture shown in FIG. 3. In various embodiments, a first request message may be a network slice service request message, a second request message may be a network slice deployment request message, a first response message may be a network slice service response message, and a second response message may be a network slice deployment response message. Various embodiments are specifically described by using the names defined above, and the first request message and the like may alternatively have other names. This is not limited herein. In the network architecture, a subscriber subscribes to a slice from an operator, and the operator designs the slice, generates slice information on a management function entity, but does not actually deploy the slice. Optionally, the operator defines a slice identification for the subscriber. When the terminal device initiates a service to the network device, the network device sends a message for requesting a slice to a management function entity, the management function entity actually deploys the slice, and the network device sends a message to the terminal device, so that the terminal device can complete a service in the corresponding slice. The Embodiments are described by using an example in which a terminal device initiates an automated driving service and a drone patrol and inspection service to the network device. A tenant completes an operation of subscribing to the slice. When the terminal device initiates an automated driving service to the network device, the network device deploys the slice that has been subscribed to, and completes the automated driving service. When the terminal device initiates a drone patrol and inspection service to the network device, the network device deploys the slice that has been subscribed to, and completes the drone patrol and inspection service.

Figure 4:
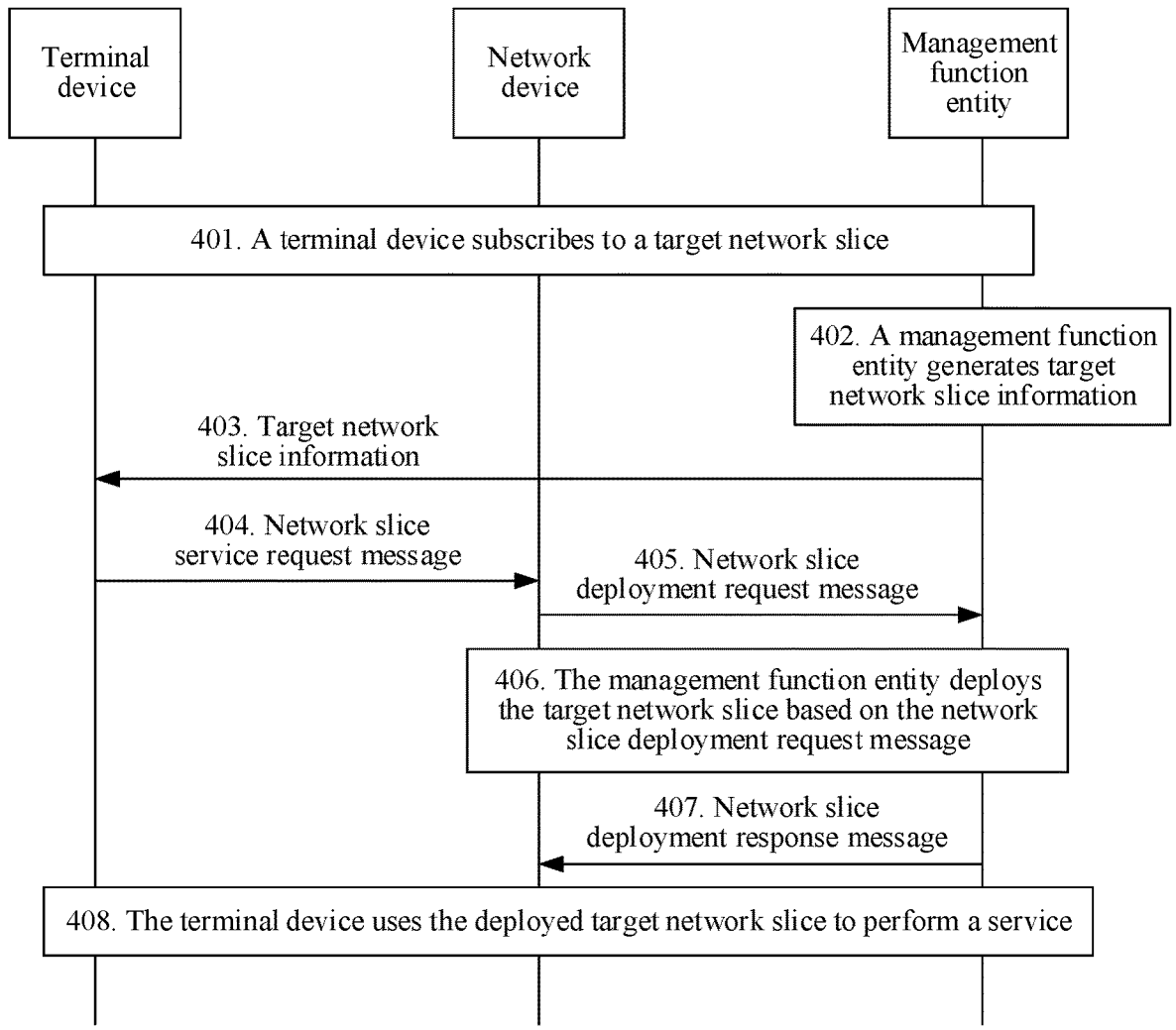
FIG. 4 is a schematic diagram of an embodiment of a network slice deployment method according to the present disclosure.

For ease of understanding, an example process of this embodiment of this application is described below. Referring to FIG. 4, an embodiment of a network slice deployment method according to various embodiments includes the following steps.

401. A terminal device subscribes to a target network slice.

A subscriber subscribes to the target network slice from an operator by using the terminal device, and the target network slice is configured to meet a requirement of a target service to be initiated by the subscriber. When the subscriber subscribes to the target network slice, the target network slice is displayed as a dynamic network slice, and when the operator identifies that the target network slice is a dynamic network slice, the operator only records the network slice, but does not actually deploy the target network slice.

It should be noted that the subscriber may subscribe to the target network slice from the operator in another manner. For example, the subscriber may reserve the network slice from the operator by using another terminal device, or may reserve the network slice through a call or by using related software. That terminal device and the terminal device that initiates the service do not need to be a same device. The terminal device that initiates the service may be a device, such as a vehicle mounted station or a drone, can use a wireless network, and the terminal device that subscribes to the network slice may be a communications device such as a smartphone.

It may be understood that, during the entire subscription process, the subscriber needs to specify a service scenario, so that the operator may properly design the network slice based on the specific service scenario. A description of the service scenario usually includes: a geographic distribution of the terminal device to which the subscriber belongs, an access frequency of the terminal device, a traffic feature of the terminal device, mobility of the terminal device, and the like. The operator usually designs the slice with reference to the service scenario of the subscriber, to convert an SLA of the subscriber to functional characteristics and resource requirements of the network device. There are a variety of forms of the SLA. For example, the subscriber may directly rent an air interface frequency spectrum of 10 MHz, or the subscriber may rent a service at a rate of 1 Gbps, or the subscriber requires each terminal to guarantee an end-to-end latency of 5 ms at a probability of 99.999%, or may be in another form. This is not specifically limited herein.

402. A management function entity generates target network slice information.

The management function entity generates the target network slice information according to an instruction of the operator, and the target network slice information corresponds to a target service to which the subscriber subscribes. The management function entity includes a network management (network management, NM) entity and a domain management (domain management, DM) entity. In example implementations, the management function entity may generate target network slice deployment information and a target network slice identification by using the network management entity NM, where the target network slice identification is used to uniquely identify the target network slice. In that implementation, the management function entity may generate a target network slice management instance by using the domain management (DM) entity, where the target network slice management instance is used to deploy the target network slice. The management instance includes subnet demand information of the subscriber, a functional characteristic and a resource policy of a subnet for meeting a demand, and the like. The DM entity checks an attribute of the slice, and if the slice is a dynamic slice, the slice is not deployed to the network device, and related information is kept only in the DM entity. The network slice deployment information may be at least one of the following information: a network slice template identification, a network slice configuration parameter, a network component required by the network slice (for example, a subnet and a network function), a virtual resource required by the network slice, and the like.

It should be noted that the network management entity includes one or all of end-to-end network management functions or end-to-end network orchestration functions, and may have some or all of the following functions: end-to-end network management (for example, lifecycle management of a network, network template management, fault management of a network, performance management of a network, and configuration management of a network); mapping between an end-to-end network and a subnet and mapping between an end-to-end network and a network function; coordination of network resources or child domain SLAs provided by different domains (for example, an access network domain, a core network domain, or a transport network domain); splitting network demand information into subnet demand information; and centralized orchestration of subnets and network functions that are provided by child domains, to enable the subnets or the network functions that are provided by the child domains to satisfy a requirement (for example, an SLA requirement, a key performance indicator (KPI) requirement, or a quality of service (QoS) requirement) of a target service or a network. The NM in this embodiment of this application mainly indicates an entity having the functions described above, this embodiment does not impose any limitation on the name of the NM, and the NM may be a cross-domain management unit, a cross-domain network slice management unit, or the like. This is not limited herein. The NM may be an independent management unit, or may be a specific function of any management unit: a network orchestration unit, a network management and orchestration unit, a service management unit, a service orchestration unit, a service management and orchestration unit, or a network function virtualization orchestrator (NFVO). The NM may be included in the operation support system (OSS), or may be not included in the OSS.

It should be noted that the domain management entity includes one or all of a subnet management function or an orchestration function, and may have some or all of the following functions: domain management (including lifecycle management (creation, update, and deletion) of a subnet, fault management of a subnet, performance management of a subnet, and configuration management of a subnet, and the like); management of a service (including lifecycle management of a service, fault management of a service, performance management of a service, and configuration management of a service, and the like); coordination of network resources (for example, a network function (network function, NF) and a network element (network element, NE)), for centralized orchestration. The DM entity in this embodiment mainly indicates an entity having the functions described above, this embodiment does not impose any limitation on the name of the DM, and the DM entity may be a domain slice management unit, a network slice subnet management unit, or the like. This is not limited herein. The DM entity may be an independent management unit, or may be a function of any management unit: a network management unit, a network orchestration unit, a network management and orchestration unit, a network element functional unit, a service management unit, a service orchestration unit, a domain management unit, a service management and orchestration unit, or an NFVO. The DM entity may be included in the OSS, or may be not included in the OSS.

It may be understood that, the subnet described above may include one or more of the following: an access network (AN) part (for example, an AN NF), a core network (CN) part (for example, a CN NF), and a transport network (TN) part. When the subnet managed by the DM entity includes only the AN part, it may be considered that the subnet management unit is an AN DM. When the subnet managed by the DM includes only the CN part, it may be considered that the subnet management unit is a CN DM. When the subnet managed by the DM includes the AN part and the CN part, it may be considered that the subnet management unit is a Mix DM.

403. The management function entity sends the target network slice information to the terminal device.

After the management function entity generates the target network slice deployment information and the target network slice identification, the management function entity sends the target network slice information to the terminal device, where the target network slice includes the target network slice deployment information and the target network slice identification, and the target network slice identification is used to: identify the target network slice, and split demand information (for example, an end-to-end (E2E) SLA) of a subscriber into subnet demand information (for example, a CN SLA, an AN SLA, and a TN SLA).

404. The terminal device sends a network slice service request message to a network device.

The terminal device sends the network slice service request message to the network device, where the network slice service request message is used to instruct to deploy a target network slice for providing a target service to the terminal device, a corresponding management function entity has allocated target network slice information for the target network slice corresponding to the target service, and the target service is a service that subscribes to the target network slice. The target service may be a temporary slice service or a low-traffic slice service. Specifically, the temporary slice service may be an automated driving service, and the low-traffic slice service may be a drone patrol and inspection service.

405. The network device sends a network slice deployment request message to the management function entity.

After the network device receives the network slice service request message sent by the terminal device, and identifies the target network slice information carried in the network slice service request message, the network device sends the network slice deployment request message to the management function entity, where the network slice deployment request message includes the target network slice information, and the network slice deployment request message is used to instruct the management function entity to deploy the target network slice corresponding to the target network slice information. In some example implementations, the network device may send the network slice deployment request message to the DM entity.

It should be noted that the network slice service request message further includes an international mobile subscriber identity (IMSI), or a mobile station integrated services digital network number (MSISDN), or may include other information. This is not specifically specified herein.

406. The management function entity deploys the target network slice based on the network slice deployment request message.

The management function entity obtains corresponding target network slice deployment information based on the target network slice information, and deploys the target network slice based on the target network slice deployment information, where the target network slice is a network slice to which the target service subscribes. In some example implementations, the DM may deploy the target network slice on the network device based on the generated management instance and the network slice deployment request message.

It may be understood that, after receiving the target network slice information that is forwarded by the network device and that is sent by the mobile terminal, the management function entity may perform authentication on the target network slice information. For example, based on a parameter of the network slice information that is generated and saved by the management function entity, the received target network slice information is verified whether to meet the requirement. If the requirement is met, the target network slice deployment information is obtained based on the received target network slice information.

It should be noted that the management function entity obtains, based on the target network slice information added by the terminal device when the terminal device initiates a service request, the target network slice deployment information that has been generated by the operator, and actually deploys the target network slice to the network device based on the target network slice deployment information. Because a location of the terminal device that initiates the service is specific, the management function entity may deploy the network slice in an area of a preset size in which the terminal device is located, and in this case, the initiated target service is in a temporarily suspended state.

407. The management function entity sends a network slice deployment response message to the network device.

When the management function entity completes the deployment of the network slice, the management function entity sends the network slice deployment response message to the network device, where the network slice deployment response message is used to indicate that the target network slice has been completely deployed.

It may be understood that, the network device may send a network slice service response message to the terminal device, where the network slice service response message is used to indicate that the terminal device can provide a service by using the deployed target network slice.

It should be noted that, after the network device receives the network slice deployment response message sent by the management function entity, the network device may further separately send a notification message to the terminal device, where the notification message is used to indicate that the target network slice has been completely deployed.

408. The terminal device uses the deployed target network slice to perform a service.

The terminal device uses the deployed target network slice to perform a service. In one feasible implementation, the terminal device receives the notification message sent by the network device, and confirms that the target network slice that is subscribed to for a to-be-initiated target service has been deployed, and the terminal device uses the deployed network slice to perform the target service. The terminal device may further initiate a service based on the network slice service response message.

It should be noted that, after the terminal device completes the target service, the terminal device may send a prompt message to the network device, and the prompt message is used to indicate that use of the target network slice has been completed, and the target network slice is no longer needed, so that the network device may delete the deployed target network slice, to release the occupied resources.

In this embodiment, the network device deploys, based on a received service request, the network slice in real time in a service initiation phase, to reduce a gap between deployment and use of the network slice, thereby saving network resources and reducing costs.

This embodiment is described below by using an example with reference to an application scenario of an automated driving service.

For example, it is assumed that five cars are traveling, and on the halfway, it is temporarily decided to group the five cars into an automated driving vehicle fleet. A subscriber A in the vehicle fleet subscribes to a slice from an operator in any available manner, including, but not limited to, making a call to a customer service of a wireless operator or using a web page or an application program provided by a wireless operator. It is clarified herein that the related five cars all have an automated driving function. After receiving a subscription request from the subscriber A, the operator generates target network slice information for the subscriber A by using an NM, including generating a target network slice identification and target network slice deployment information for a target network slice, splits demand information (for example, an E2E SLA) of the tenant into subnet demand information (such as a CN SLA, an AN SLA, or a TN SLA), and marks the target network slice as a dynamic slice, where the target network slice provides a service for the automated driving service. The NM may return one target network slice identification to the operator, the operator may inform the vehicle fleet of the identification, and the vehicle fleet may use the identification to activate the network slice. The NM deploys the target network slice to the DM entity, and the DM entity generates a management instance for the target network slice, where the management instance includes subnet demand information of the subscriber, a functional characteristic and a resource policy of a subnet for meeting a demand, and the like. The DM entity checks an attribute of the target network slice, and if the slice is a dynamic slice, the slice is not deployed to the network device, and related information is kept only in the DM entity. A vehicle terminal in the vehicle fleet initiates a call to access the network device, where the vehicle terminal carries an identification specified by the operator in the call. When dealing with the call from the vehicle terminal, the network device finds that the UE carries a particular identification (target network slice identification), and after the particular identification is successfully authenticated, the network device requests the management function entity to deploy the slice. The management function entity indexes, based on the particular identification carried by the vehicle terminal when the vehicle terminal initiates the call, the target network slice deployment information that has been generated by the operator, and actually deploys the network slice for the network device based on the corresponding target network slice deployment information. Because a location of the terminal that initiates the service is specific, the deployment occurs only in a relatively small area in which the terminal device is located, and in this case, the service of the vehicle mounted station is in a temporarily suspended state. After the target network slice is completely deployed, the service of the vehicle mounted station is activated, and the vehicle mounted station may continue to perform the automated driving service. In this embodiment of this application, based on the foregoing process, the network device may deploy the slice in advance on a traveling route of the vehicle fleet, so that large-scale deployment is not needed, thereby saving network resources.

Figure 5:
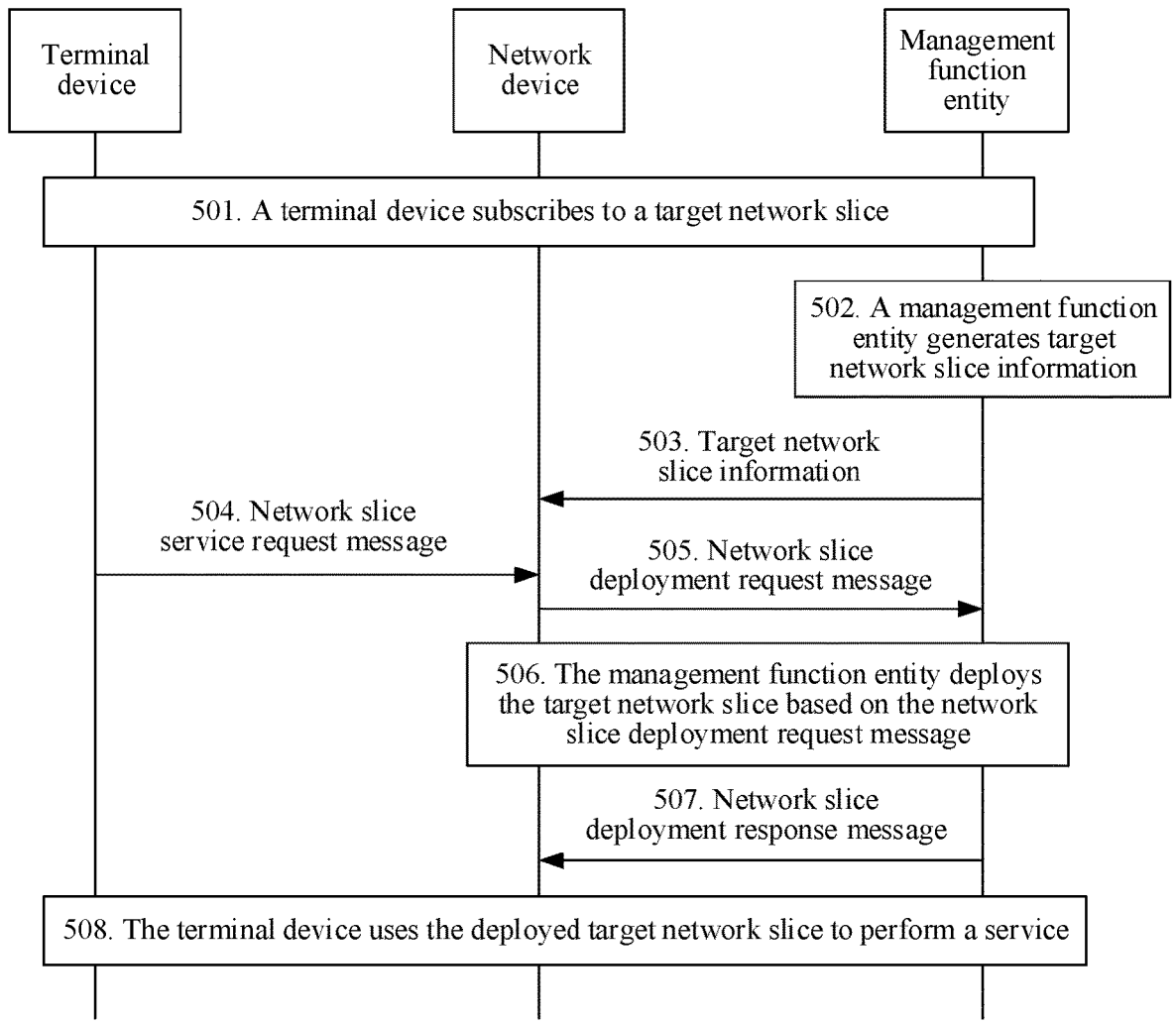
FIG. 5 is a schematic diagram of another embodiment of a network slice deployment method according to the present disclosure.

Referring to FIG. 5, another embodiment of a network slice deployment method according to the Embodiments includes the following steps.

501. A terminal device subscribes to a target network slice.

A subscriber subscribes to the target network slice from an operator by using the terminal device, and the target network slice is configured to meet a requirement of a target service to be initiated by the subscriber. When the subscriber subscribes to the target network slice, the target network slice is displayed as a dynamic network slice, and when the operator identifies that the target network slice is a dynamic network slice, the operator only records the network slice, but does not actually deploy the target network slice.

It should be noted that the subscriber may subscribe to the target network slice from the operator in another manner. For example, the subscriber may reserve the network slice from the operator by using another terminal device, or may reserve the network slice through a call or by using related software. That terminal device and the terminal device that initiates the service do not need to be a same device. The terminal device that initiates the service may be a device, such as a vehicle mounted station or a drone, can use a wireless network, and the terminal device that subscribes to the network slice may be a communications device such as a smartphone.

It may be understood that, during the entire subscription process, the subscriber needs to specify a service scenario, so that the operator may properly design the network slice based on the specific service scenario. A description of the service scenario usually includes: a geographic distribution of the terminal device to which the subscriber belongs, an access frequency of the terminal device, a traffic feature of the terminal device, mobility of the terminal device, and the like. The operator usually designs the slice with reference to the service scenario of the subscriber, to convert an SLA of the subscriber to functional characteristics and resource requirements of the network device. There are a variety of forms of the SLA. For example, the subscriber may directly rent an air interface frequency spectrum of 10 MHz, or the subscriber may rent a service at a rate of 1 Gbps, or the subscriber requires each terminal to guarantee an end-to-end latency of 5 ms at a probability of 99.999%, or may be in another form. This is not specifically limited herein.

502. A management function entity generates target network slice information.

The management function entity generates the target network slice information according to an instruction of the operator, and the target network slice information corresponds to a target service to which the subscriber subscribes. The management function entity includes a NM and a DM entity. In some example implementations, the management function entity may generate target network slice deployment information and a target network slice identification by using the network management entity NM, where the target network slice identification is used to uniquely identify the target network slice; and the management function entity generates a target network slice management instance by using the DM entity, where the target network slice management instance is used to deploy the target network slice. The management instance includes subnet demand information of the subscriber, a functional characteristic, a resource policy, and the like of a subnet for meeting a demand. The DM entity checks an attribute of the slice, and if the slice is a dynamic slice, the slice is not deployed to the network device, and related information is kept only in the DM entity.

It should be noted that the network management entity includes one or all of end-to-end network management functions or end-to-end network orchestration functions, and may have some or all of the following functions: end-to-end network management (for example, lifecycle management of a network, network template management, fault management of a network, performance management of a network, and configuration management of a network); mapping between an end-to-end network and a subnet and mapping between an end-to-end network and a network function; coordination of network resources or child domain SLAs provided by different domains (for example, an access network domain, a core network domain, or a transport network domain); splitting network demand information into subnet demand information; and centralized orchestration of subnets and network functions that are provided by child domains, to enable the subnets or the network functions that are provided by the child domains to satisfy a requirement (for example, an SLA requirement, a key performance indicator (key performance indicator, KPI) requirement, or a quality of service (quality of service, QoS) requirement) of a target service or a network. The NM in this embodiment of this application mainly indicates an entity having the functions described above, this embodiment does not impose any limitation on the name of the NM, and the NM may be a cross-domain management unit, a cross-domain network slice management unit, or the like. This is not specifically limited herein. The NM may be an independent management unit, or may be a specific function of any management unit: a network orchestration unit, a network management and orchestration unit, a service management unit, a service orchestration unit, a service management and orchestration unit, or a network function virtualization orchestrator (NFVO). The NM may be included in the operation support system (OSS), or may be not included in the OSS.

It should be noted that the domain management entity includes one or all of a subnet management function or an orchestration function, and may have some or all of the following functions: domain management (including lifecycle management (creation, update, and deletion) of a subnet, fault management of a subnet, performance management of a subnet, and configuration management of a subnet, and the like); management of a service (including lifecycle management of a service, fault management of a service, performance management of a service, and configuration management of a service, and the like); coordination of network resources (for example, a network function (NF) and a network element (NE)), for centralized orchestration. The DM entity in this embodiment of this application mainly indicates an entity having the functions described above, this embodiment does not impose any limitation on the name of the DM entity, and the DM entity may be a domain slice management unit, a network slice subnet management unit, or the like. This is not limited herein. The DM may be an independent management unit, or may be a specific function of any management unit: a network management unit, a network orchestration unit, a network management and orchestration unit, a network element functional unit, a service management unit, a service orchestration unit, a domain management unit, a service management and orchestration unit, or an NFVO. The DM entity may be included in the OSS, or may be not included in the OSS.

It may be understood that, the subnet described above may include one or more of the following: an access network (AN) part (for example, an AN NF), a core network (CN) part (for example, a CN NF), and a transport network (TN) part. When the subnet managed by the DM entity includes only the AN part, it may be considered that the subnet management unit is an AN DM. When the subnet managed by the DM entity includes only the CN part, it may be considered that the subnet management unit is a CN DM. When the subnet managed by the DM entity includes the AN part and the CN part, it may be considered that the subnet management unit is a Mix DM.

503. The management function entity sends target network slice identification information to the network device.

After the management function entity generates the target network slice deployment information and the target network slice identification, the management function entity sends the target network slice identification information to the network device, where the target network slice includes the target network slice deployment information and the target network slice identification, and the target network slice identification is used to: identify the target network slice, and split subscriber demand information (such as an E2E SLA) into subnet demand information (such as a CN SLA, an AN SLA, and a TN SLA). Specifically, the network device may write the target network slice identification through the NM into a home subscriber server (home subscriber server, HSS) by using the IMSI or MSISDN of the terminal device as an index.

504. The terminal device sends a network slice service request message to a network device.

The terminal device sends the network slice service request message to the network device, where the network slice service request message is used to instruct to deploy a target network slice for providing a target service to the terminal device, a corresponding management function entity has allocated target network slice information for the target network slice corresponding to the target service, and the target service is a service that subscribes to the target network slice. The target service may be a temporary slice service or a low-traffic slice service. Specifically, the temporary slice service may be an automated driving service, and the low-traffic slice service may be a drone patrol and inspection service.

505. The network device sends a network slice deployment request message to the management function entity.

After the network device receives the network slice service request message sent by the terminal device, the HSS is triggered by the network slice service request message of the terminal device, and the network device sends, based on the target network slice information stored in the HSS, the network slice deployment request message to the management function entity, where the network slice deployment request message includes the target network slice identification, the target network slice identification is used to identify a target network slice, and the network slice deployment request message is used to instruct the management function entity to deploy the target network slice corresponding to the target network slice information. Specifically, the network device sends the network slice deployment request message to the domain management entity DM entity.

It should be noted that, the network slice service request message further includes the IMSI or the MSISDN, or may further include other information. This is not specifically limited herein.

506. The management function entity deploys the target network slice based on the network slice deployment request message.

The management function entity obtains corresponding target network slice deployment information based on the target network slice information, and deploys the target network slice based on the target network slice deployment information, where the target network slice is a network slice to which the target service subscribes. Specifically, the DM entity deploys the target network slice on the network device based on the generated management instance and the network slice deployment request message.

It should be noted that the management function entity indexes, based on the target network slice information added by the terminal device when the terminal device initiates a service request, the target network slice deployment information that has been generated by the operator, and actually deploys the target network slice to the network device based on the target network slice deployment information. Because a location of the terminal device that initiates the service is specific, the management function entity may deploy the network slice in an area of a preset size in which the terminal device is located, and in this case, the initiated target service is in a temporarily suspended state.

507. The management function entity sends a network slice deployment response message to the network device.

When the management function entity completes the deployment of the network slice, the management function entity sends the network slice deployment response message to the network device, where the network slice deployment response message is used to indicate that the target network slice has been completely deployed.

It may be understood that, the network device may send a network slice service response message to the terminal device, where the network slice service response message is used to indicate that the terminal device can provide a service by using the deployed target network slice.

It should be noted that, after the network device receives the network slice deployment response message sent by the management function entity, the network device may further separately send a notification message to the terminal device, where the notification message is used to indicate that the target network slice has been completely deployed.

508. The terminal device uses the deployed target network slice to perform a service.

The terminal device uses the deployed target network slice to perform a service. In one feasible implementation, the terminal device receives the notification message sent by the network device, and confirms that the target network slice that is subscribed to for a to-be-initiated target service has been deployed, and the terminal device uses the deployed network slice to perform the target service. The terminal device may further initiate a service based on the network slice service response message.

It should be noted that, after the terminal device completes the target service, the terminal device may send a prompt message to the network device, and the prompt message is used to indicate that use of the target network slice has been completed, and the target network slice is no longer needed, so that the network device may delete the deployed target network slice, to release the occupied resources.

This embodiment is described below by using an example with reference to an application scenario of a drone patrol and inspection service.

For example, an example electric power company needs to perform a half-yearly patrol and inspection service for transmission lines by using a drone, and the electric power company may subscribe to a slice from an operator in any manner at any time. After receiving a subscription request from the electric power company, the operator generates target network slice information for the electric power company by using an NM, including generating a target network slice identification and target network slice deployment information for a target network slice, splits demand information (such as an E2E SLA) of the tenant into subnet demand information (such as a CN SLA, an AN SLA, or a TN SLA), and marks the target network slice as a dynamic slice, where the target network slice provides a service for the drone patrol and inspection service. The NM may write the target network slice identification into an HSS by using an IMSI or an MSISDN of the UE provided by a subscriber when the subscriber subscribes to the slice as an index. The NM deploys the target network slice to the DM entity, and the DM entity generates a management instance for the target network slice, where the management instance includes subnet demand information of the subscriber, a functional characteristic and a resource policy of a subnet for meeting a demand, and the like. The DM checks an attribute of the target network slice, and if the slice is a dynamic slice, the slice is not deployed to the network device, and related information is kept only in the DM entity. When the drone actually conducts the patrol and inspection service, the drone terminal initiates a call to access the network device. When dealing with the call from the drone terminal, the network device finds a particular identification (target network slice identification) of the UE in the HSS, and requests the management function entity to deploy the slice. The management function entity indexes, based on the particular identification of the drone terminal, the target network slice deployment information that has been generated by the operator, and actually deploys the network slice for the network device based on the corresponding target network slice deployment information. Because a location of the terminal that initiates the service is specific, the deployment occurs only in a relatively small area in which the drone terminal is located, and in this case, the service of the drone terminal is in a temporarily suspended state. After the target network slice is completely deployed, the service of the drone patrol and inspection is activated, and the drone terminal may continue to perform the patrol and inspection service. In this embodiment of this application, based on the foregoing process, the network device may deploy the slice only when the drone actually performs the service, so that long time deployment is not needed, thereby saving network resources.

Figure 6:
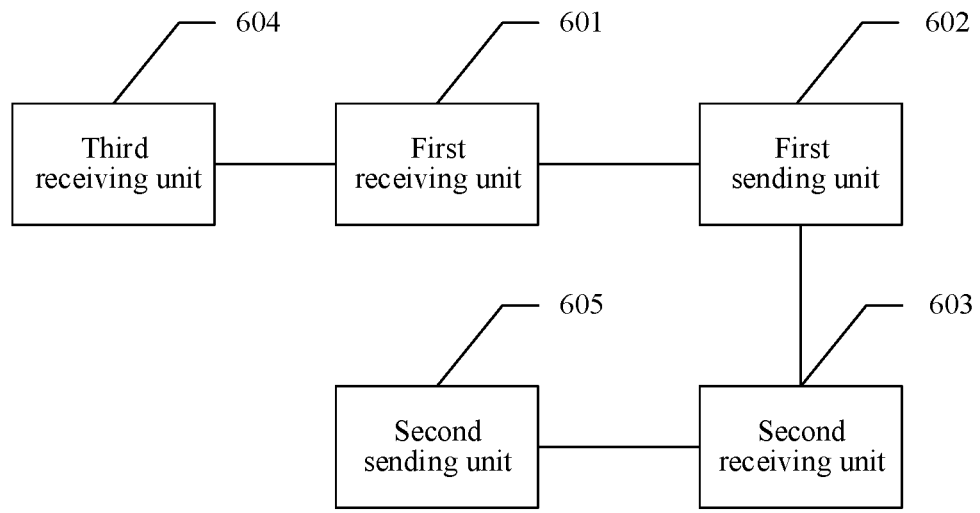
FIG. 6 is a schematic diagram of an embodiment of a network device according to the present disclosure.

The network slice deployment method in various embodiments is described above. The network device, the terminal device, and the management function entity in various embodiments are described below. In various embodiments, the network device in accordance with the present disclosure is a base station described and illustrated herein. Referring to FIG. 6, an embodiment of a network device according to present disclosure includes:

a first receiving unit 601, configured to receive a first request message sent by a terminal device, where the first request message is used to instruct to deploy a target network slice for providing a target service to the terminal device, and a corresponding management function entity has allocated target network slice information for the target network slice corresponding to the target service;

a first sending unit 602, configured to send a second request message to the management function entity, where the second request message carries the target network slice information, and the second request message is used to instruct the management function entity to deploy the target network slice corresponding to the target network slice information; and a second receiving unit 603, configured to receive a second response message sent by the management function entity, where the second response message is used to indicate that the target network slice has been completely deployed.

In an example, the network device may further include:

a third receiving unit 604, configured to receive the target network slice information sent by the management function entity, where the target network slice information includes a target network slice identification.

In an example, the network device may further include:

a second sending unit 605, configured to send a first response message to the terminal device, where the first response message is used to indicate that the terminal device can provide a service by using the deployed target network slice.

Figure 7:
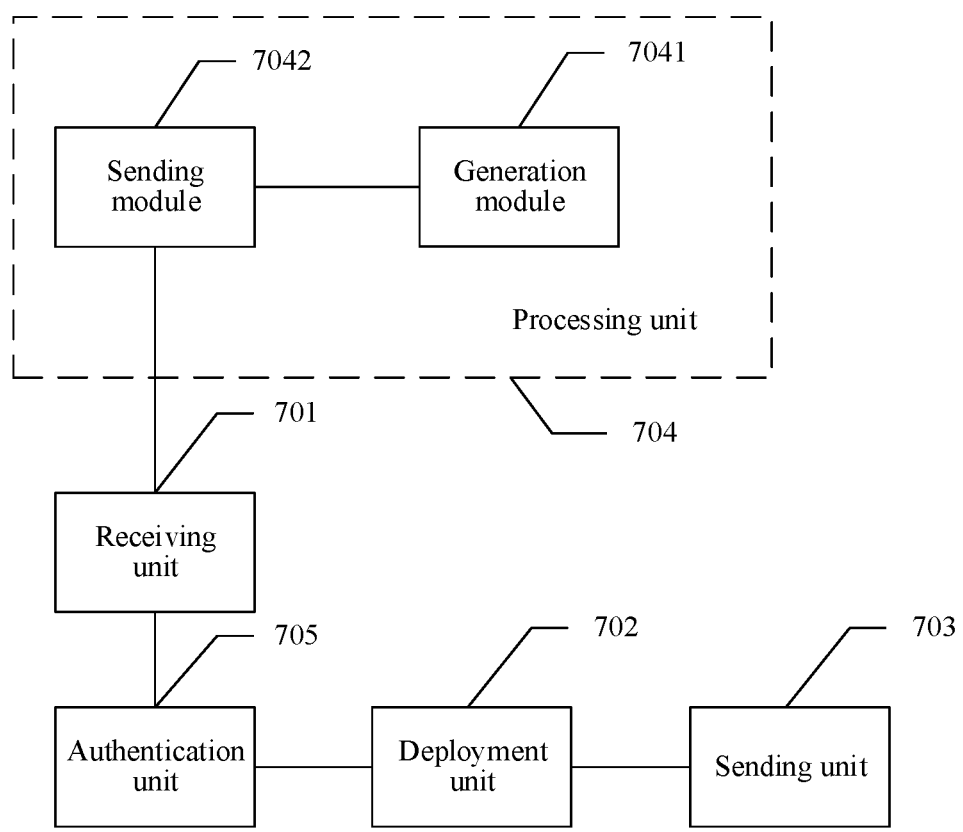
FIG. 7 is a schematic diagram of an embodiment of a management function entity according to the present disclosure.

Referring to FIG. 7, an embodiment of a management function entity according to various embodiments includes:

a receiving unit 701, configured to receive a second request message sent by a network device, where the second request message carries target network slice information;

a deployment unit 702, configured to: obtain corresponding target network slice deployment information based on the target network slice information, and deploy a target network slice based on the target network slice deployment information; and a sending unit 703, configured to send a second response message to the network device, where the second response message is used to indicate that the target network slice has been completely deployed.

In an example, the management function entity may further include:

a processing unit 704, configured to generate the target network slice information.

In an example, the processing unit 704 includes:

a generation module 7041, configured to generate a target network slice identification and the corresponding target network slice deployment information by using a network management entity, where the target network slice deployment information is used to deploy the target network slice.

In an example, the processing unit 704 includes:

a sending module 7042, configured to send the target network slice information to the network device, or send the target network slice information to the terminal device.

In an example, the management function entity may further include:

an authentication unit 705, configured to perform authentication on the received target network slice information.

Figure 8:
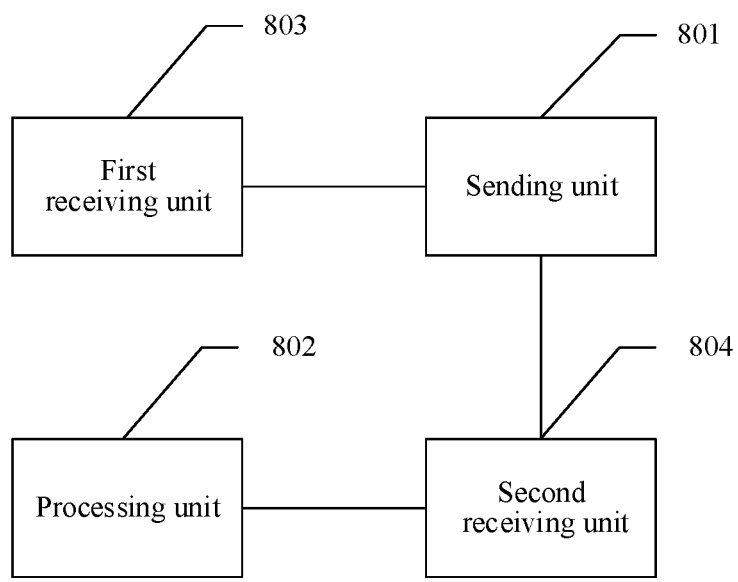
FIG. 8 is a schematic diagram of an embodiment of a terminal device according to the present disclosure.

Referring to FIG. 8, an embodiment of a terminal device according to the present disclosure includes:

a sending unit 801, configured to send a first request message to a network device, where the first request message is used to instruct to deploy a target network slice for providing a target service to the terminal device, and a corresponding management function entity has allocated target network slice information for the target network slice corresponding to the target service; and a processing unit 802, configured to use the deployed target network slice to perform a service.

In an example, the terminal device may further include:

a first receiving unit 803, configured to receive the target network slice information sent by the management function entity.

In an example, the terminal device may further include:

a second receiving unit 804, configured to receive a first response message sent by the network device, where the first response message is used to indicate that the terminal device can provide a service by using the deployed target network slice.

FIG. 6 to FIG. 8 above separately describe the network device, the management function entity, and the terminal device in various embodiments in detail from a perspective of a modularized function entity, and the network device, the management function entity, and the terminal device in various embodiments are described below in detail from a perspective of hardware processing.

Figure 9:
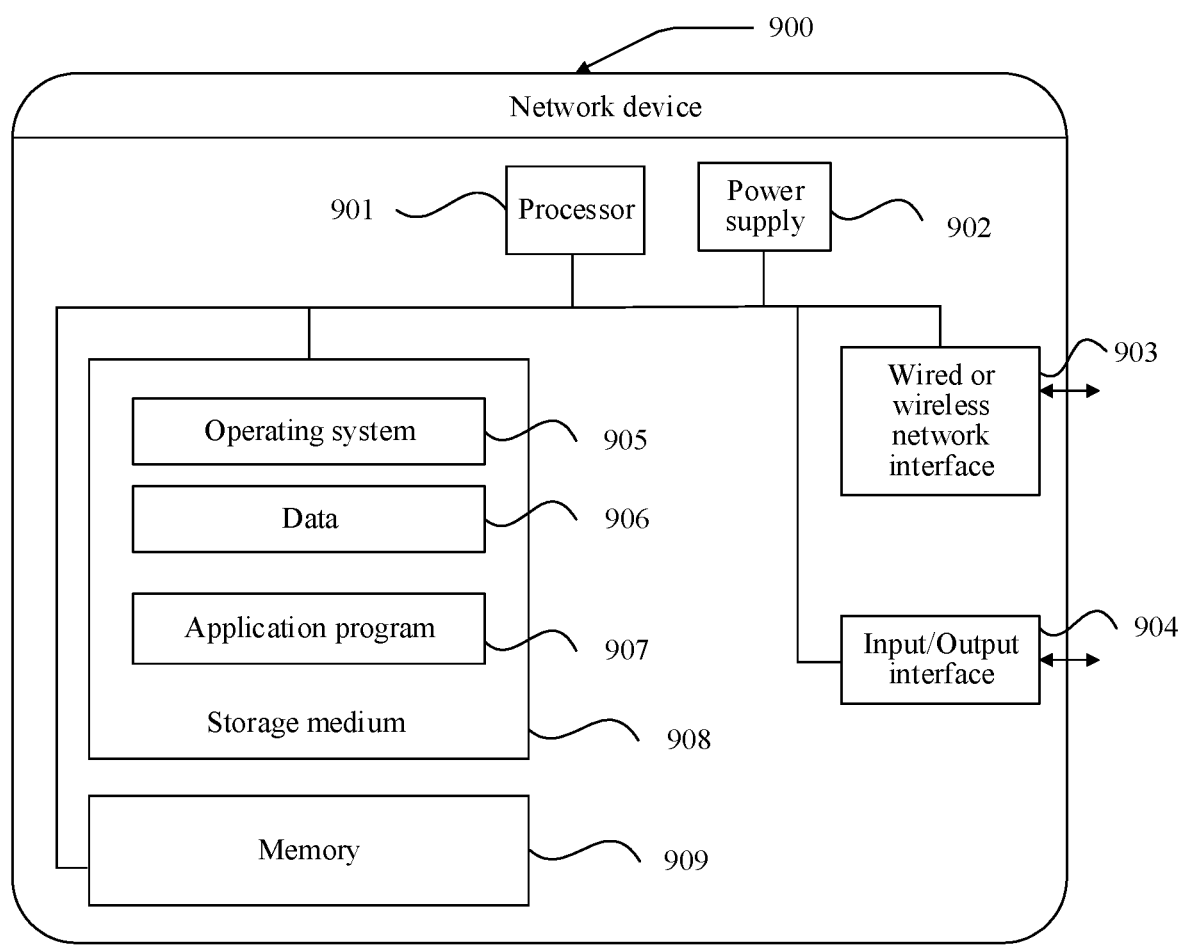
FIG. 9 is a schematic diagram of another embodiment of a network device according to the present disclosure.

FIG. 9 is a schematic structural diagram of a network device according to an embodiment of this application. The network device 900 may vary greatly due to different configurations or performance, and may include one or more processors (central processing units, CPU) 901 (for example, one or more processors) and a memory 909, and one or more storage media 908 (for example, one or more massive storage devices) that store an application program 907 or data 906. The memory 909 and the storage medium 908 may be transient or persistent storages. The program stored in the storage medium 908 may include one or more modules (not shown in the figure), and each module may include a series of instructions and operations for the network device. Still further, the processor 901 may be configured to: communicate with the storage medium 908, and perform, on the network device 900, the series of instruction and operations in the storage medium 908.

The network device 900 may further include one or more power supplies 902, one or more wired or wireless network interfaces 903, one or more input/output interfaces 904, and/or one or more operating systems 905, for example, Windows Server, Mac OS X, Unix, Linux, or FreeBSD. A person skilled in the art may understand that the structure of the network device shown in FIG. 9 does not constitute a limitation to the network device, and the network device may include more components or fewer components than those shown in the figure, or a combination of some components, or a different component arrangement.

The components of the network device are described in detail below with reference to FIG. 9.

The processor 901 is a control center of the network device, and may perform processing based on a set network slice deployment method. The processor 901 connects all parts of the entire network device by using various interfaces and lines, performs various functions of the network device and processes data by running or executing the software program and/or module stored in the memory 909 and by invoking the data stored in the memory 909, to implement the deployment of the network slice.

The memory 909 may be configured to store a software program and a module, and the processor 901 runs the software program and the module that are stored in the memory 909, to perform various functional applications of the network device 900 and data processing. The memory 909 may mainly include a program storage area and a data storage area. The program storage area may store an operating system, an application program required by at least one function (for example, a function of deploying a slice), and the like. The data storage area may store data (for example, a network slice deployment request message) created based on use of the network device, and the like. In addition, the memory 909 may include a high-speed random access memory, and may also include a non-volatile memory such as at least one magnetic disk storage component, a flash memory, or another volatile solid-state storage device. The program and the received data flow of the network slice deployment method according to the Embodiments are stored in the memory, and when the program and the received data flow need to be used, the processor 901 invokes them from the memory 909.

Figure 10A:
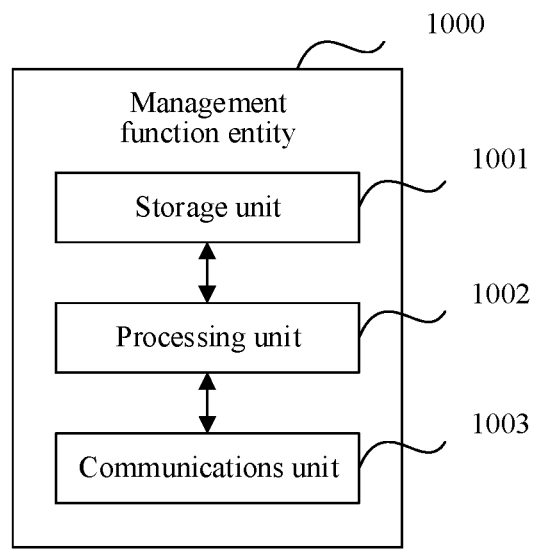
FIG. 10A is a schematic diagram of another embodiment of a management function entity according to the present disclosure.

FIG. 10A is a schematic structural diagram of a management function entity according to one embodiment. When an integrated unit is used, FIG. 10A is an example schematic structural diagram of the management function entity included in the foregoing embodiment. The management function entity 1000 includes: a processing unit 1002 and a communications unit 1003. The processing unit 1002 is configured to control and manage an action of the management function entity. For example, the processing unit 1002 is configured to support the management function entity in performing step 402, step 403, step 406, and step 407 in the FIG. 4, and/or another process of the technology described in this specification. The communications unit 1003 is configured to support the management function entity in communicating with another network entity. The management function entity may further include a storage unit 1001, configured to store program code and data of the management function entity.

The processing unit 1002 may be a processor or a controller, for example, may be a central processing unit (central processing unit, CPU), a general-purpose processor, a digital signal processor (digital signal processor, DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application. Alternatively, the processor may be a combination implementing a computing function, for example, including a combination of one or more microprocessors, or a combination of the DSP and a microprocessor, or the like. The communications unit 1003 may be a communications interface, a transceiver, a transceiver circuit, or the like. The communications interface is a general term and may include one or more interfaces, for example, a transceiver interface. The storage unit 1001 may be a memory.

Figure 10B:
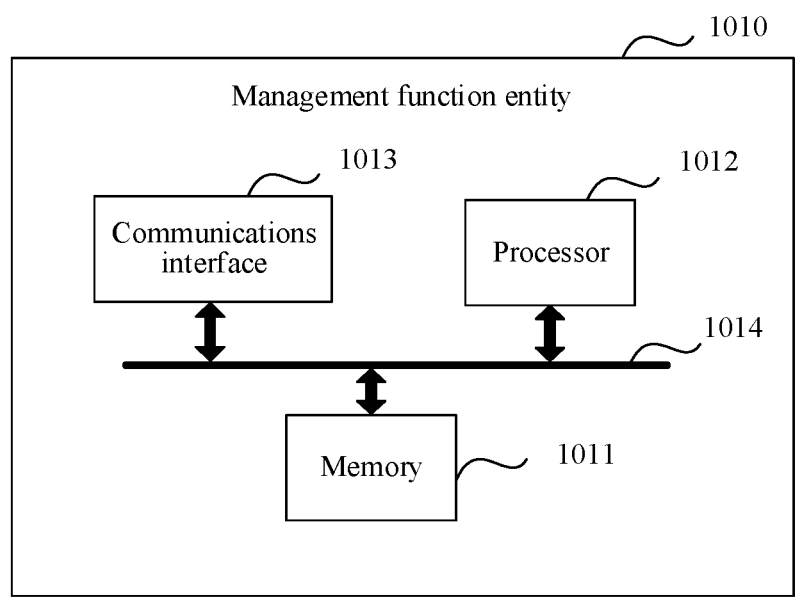
FIG. 10B is a schematic diagram of another embodiment of a management function entity according to the present disclosure.

When the processing unit 1002 is a processor, the communications unit 1003 is a communications interface, and the storage unit 1001 is a memory, the management function entity included in this embodiment of this application may be a management function entity shown in FIG. 10B.

Referring to FIG. 10B, the management function entity 1010 includes: a processor 1012, a communications interface 1013, and a memory 1011. Optionally, the management function entity 1010 may further include a bus 1014. The communications interface 1013, the processor 1012, and the memory 1011 are interconnected through the bus 1014. The bus 1014 may be a peripheral component interconnect (PCI) bus, an extended industry standard architecture (EISA) bus, or the like. The bus 1014 may be classified into an address bus, a data bus, a control bus, and the like. For ease of representation, only one bold line is used to represent the bus in FIG. 10B, but this does not mean that there is only one bus or only one type of bus.

The components of the terminal device are described in detail below with reference to FIG. 11.

Figure 11:
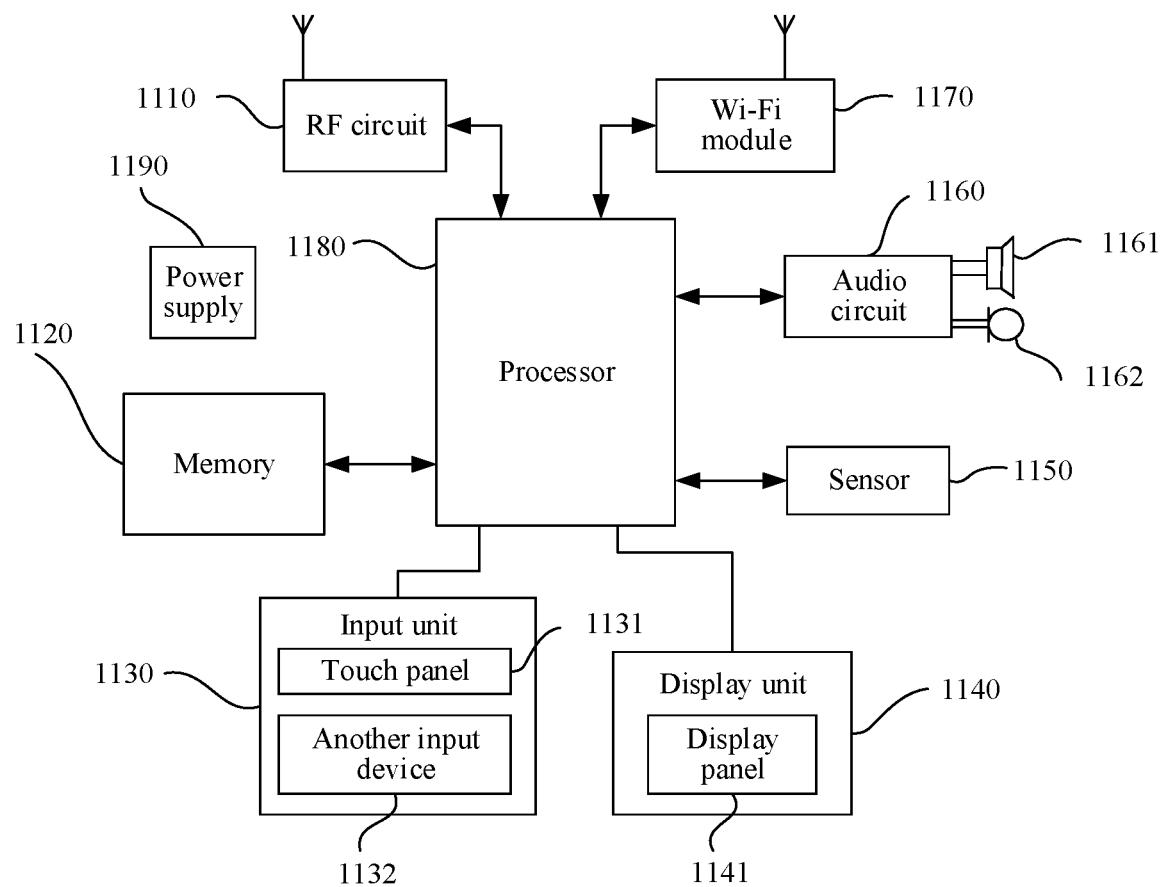
FIG. 11 is a schematic diagram of another embodiment of a terminal device according to the present disclosure.

FIG. 11 is a block diagram of a partial structure of a terminal device according to an embodiment of this application. Referring to FIG. 11, the terminal device includes components such as a radio frequency (RF) circuit 1110, a memory 1120, an input unit 1130, a display unit 1140, a sensor 1150, an audio circuit 1160, a wireless fidelity (Wi-Fi) module 1170, and a processor 1180. A person skilled in the art may understand that the structure of the terminal device shown in FIG. 11 does not constitute a limitation to the terminal device, and the terminal device may include more components or fewer components than those shown in the figure, or a combination of some components, or a different component arrangement.

The processor 1180 is a control center of the terminal device. In the Embodiments, a network slice may be subscribed to in advance from the operators, and after a network device deploys the network slice for the terminal device to perform an initiated service, the deployed network slice is used to perform the service.

The RF circuit 1110 is connected to the processor 1180 through a bus, is responsible for sending data to the Internet or receiving data from the Internet, and may be configured to: receive and send a message or receive and send a signal during a call process, and in particular, send a network slice service request message to a network device. In addition, after receiving a network slice service response message sent by the network device, the RF circuit sends the network slice service response message to the processor 1180 for processing. Usually, the RF circuit 1110 includes, but is not limited to, an antenna, at least one amplifier, a transceiver, a coupler, a low noise amplifier (LNA), a duplexer, and the like. In addition, the RF circuit 1110 may also communicate with a network and another device through wireless communication. The wireless communication may use any communications standard or protocol, including, but not limited to, a global system for mobile communications (GSM), a general packet radio service (GPRS), code division multiple access (CDMA), wideband code division multiple access (WCDMA), long-term evolution (LTE), an email, a short message service (SMS), and the like.

The memory 1120 may be configured to store a software program and a module. The processor 1180 runs the software program and the module that are stored in the memory 1120, to perform various functional applications of the terminal device and data processing. The memory 1120 may mainly include a program storage area and a data storage area. The program storage area may store an operating system, an application program required by at least one function (for example, a function of sending a network slice service request message, or a function of using the network slice to perform a service), and the like. The data storage area may store data (for example, an international mobile subscriber identity, a mobile station integrated services digital network number) created based on use of a mobile terminal, and the like. In addition, the memory 1120 may include a high-speed random access memory, and may also include a non-volatile memory such as at least one magnetic disk storage component, a flash memory, or another volatile solid-state storage device.

The computer program product includes one or more computer instructions. When the computer program instructions are loaded and executed on the computer, the procedures or functions according to various embodiments are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the Embodiments. The foregoing storage medium includes: any medium that can store program code, such as a USB flash drive, a removable hard disk, a read-only memory (ROM), a random access memory (RAM), a magnetic disk, or an optical disc.

What is claimed is:

1. A network slice deployment method, comprising:
   receiving, by a network device, a first request message from a terminal device, wherein the first request message is configured for instructing to deploy a target network slice for providing a target service to the terminal device, and a corresponding management function entity has allocated target network slice information for the target network slice corresponding to the target service;
   sending, by the network device, a second request message to the management function entity, wherein the second request message carries the target network slice information, and the second request message is configured for instructing the management function entity to deploy the target network slice corresponding to the target network slice information; and
   sending, by the management function entity, a second response message to the network device, wherein the second response message is configured for indicating that the target network slice has been completely deployed.

2. The deployment method according to claim 1, wherein before receiving, by the network device, the first request message from the terminal device, the method further comprises:
   sending, by the management function entity, the target network slice information to the network device, wherein the target network slice information comprises a target network slice identification.

3. The deployment method according to claim 1, wherein after the sending, by the management function entity, the second response message to the network device, the method further comprises:
   sending, by the network device, a first response message to the terminal device, wherein the first response message is configured for indicating that the terminal device can provide a service by using the deployed target network slice.

4. A network slice deployment system, comprising: a network device and a management function entity;
   the network device is configured to receive a first request message from a terminal device, wherein the first request message is configured for instructing to deploy a target network slice for providing a target service to the terminal device;
   the management function entity is configured to allocate target network slice information for the target network slice corresponding to the target service;
   the network device is configured to send a second request message to the management function entity, wherein the second request message carries the target network slice information, and the second request message is configured for instructing the management function entity to deploy the target network slice corresponding to the target network slice information; and the management function entity is configured to send a second response message to the network device, wherein the second response message is configured for indicating that the target network slice has been completely deployed.

5. The deployment system according to claim 4, wherein the management function entity is configured to, before the network device receives the first request message, send the target network slice information to the network device, wherein the target network slice information comprises a target network slice identification.

6. The deployment system according to claim 4, wherein the network device is configured to send, after the management function entity sends the second response message to the network device, a first response message to the terminal device, wherein the first response message is configured for indicating that the terminal device can provide a service by using the deployed target network slice.

7. An apparatus applied for a network device, comprising: at least one processor, and a memory storing instructions executable by the at least one processor; wherein, when executed, the instructions cause the at least one processor to perform:

receiving, a first request message from a terminal device, wherein the first request message is configured for instructing to deploy a target network slice for providing a target service to the terminal device, and wherein target network slice information for the target network slice corresponding to the target service has allocated by a corresponding management function entity;

sending, a second request message to the management function entity, wherein the second request message carries the target network slice information, and the second request message is configured for instructing the management function entity to deploy the target network slice corresponding to the target network slice information; and receiving, a second response message from the management function entity, wherein the second response message is configured for indicating that the target network slice has been completely deployed.

8. The apparatus according to claim 7, wherein when executed, the instructions cause the at least one processor to perform:

before receiving the first request message from the terminal device, receiving, the target network slice information from the management function entity, wherein the target network slice information comprises a target network slice identification.

9. The apparatus according to claim 7, wherein when executed, the instructions cause the at least one processor to perform:

after receiving the second response message from the management function entity, sending, a first response message to the terminal device, wherein the first response message is configured for indicating that the terminal device can provide a service by using the deployed target network slice.

10. An apparatus applied for a terminal device, comprising: at least one processor, and a memory storing instructions executable by the at least one processor; wherein, when executed, the instructions cause the apparatus to:

receive the target network slice information from a corresponding management function entity;

after receiving the target network slice information, sending a first request message to a network device, wherein the first request message is configured for instructing to deploy a target network slice for providing a target service to the terminal device, and wherein target network slice information for the target network slice corresponding to the target service is allocated by the corresponding management function entity; and performing, a service by using the deployed target network slice.

11. The apparatus according to claim 10, wherein the first request message comprises the target network slice information.

12. The apparatus according to claim 10, wherein when executed, the instructions cause the at least one processor to perform:

after sending the first request message to the network device and before the performing the service by using the deployed target network slice, receiving, a first response message from the network device, wherein the first response message is used to indicate that the terminal device can provide a service by using the deployed target network slice.

* * * * *

UNITED STATES PATENT AND TRADEMARK OFFICE
CERTIFICATE OF CORRECTION

| | | |
|---|---|---|
| PATENT NO. | : 11,228,947 B2 | Page 1 of 1 |
| APPLICATION NO. | : 16/828964 | |
| DATED | : January 18, 2022 | |
| INVENTOR(S) | : Tang et al. | |

It is certified that error appears in the above-identified patent and that said Letters Patent is hereby corrected as shown below:

In the Specification

In Column 1, Line 10 (approx.), delete "2017," and insert -- 2017. --.

Signed and Sealed this
Third Day of May, 2022

*Katherine Kelly Vidal*

Katherine Kelly Vidal
*Director of the United States Patent and Trademark Office*